United States Patent [19]
McGuffin

[11] Patent Number: 5,335,181
[45] Date of Patent: Aug. 2, 1994

[54] TERRAIN REFERENCED NAVIGATION—WOODS DATA BASE MODEL

[75] Inventor: John T. McGuffin, Albuquerque, N. Mex.

[73] Assignee: Honeywell Inc., Minneapolis, Minn.

[21] Appl. No.: 821,725

[22] Filed: Jan. 15, 1992

[51] Int. Cl.$^5$ .............................................. G06F 15/50
[52] U.S. Cl. .................................. 364/443; 364/449; 364/453; 342/64
[58] Field of Search ............... 364/443, 449, 450, 456, 364/453, 460; 342/63, 64, 65

[56] References Cited

U.S. PATENT DOCUMENTS

| | | | |
|---|---|---|---|
| 4,144,571 | 3/1979 | Webber | 364/450 |
| 4,520,445 | 5/1985 | Keearns | 364/450 |
| 4,584,646 | 4/1986 | Chan et al. | 364/449 |
| 4,829,304 | 5/1989 | Baird | 364/449 |
| 4,894,659 | 1/1990 | Andrews | 342/64 |
| 4,939,663 | 7/1990 | Baird | 364/449 |
| 4,954,837 | 9/1990 | Baird et al. | 364/449 |
| 5,047,777 | 9/1991 | Metzdorff et al. | 342/64 |

OTHER PUBLICATIONS

Larry D. Hostetler and Ronald D. Andreas in a paper entitled *Nonlinear Kalman Filtering Techniques for Terrain-Aided Navigation*, IEEE Transactions on Automatic Control, vol. AC-28, No. 3, Mar. 1983, pp. 315-323.

The proceedings of the IEEE National Aerospace and Electronics Conference-NAECON, May 20-24, 1985 entitled *The AFTI/F*16.

*Terrain-Aided Navigation System*, by D. D. Boozer, M. K. Lau, J. R. Fellerhoff, Sandia National Laboratories, Albuquerque, N. Mex. 87185, pp. 351-357.

Eric Skarman of SAAB Scandia AB Aerospace Division in a paper entitled *Kalman Filter For Terrain-Aided Navigation*, pp. 25.1-25.10.

Charles A Baird and Mark R. Abramson in a paper entitled *A Comparison of Several Digital Map-Aided Navigation Techniques*, 1984, IEEE Journal, pp. 286-293.

J. R. Fellerhoff in a paper entitled *SITAN Implementation in the SAINT System*, 1986, IEEE Journal, pp. 89-95.

Carlos A. Bedoya in a paper entitled *Terrain Aided Navigation Algorithms Survey*, McDonnell Douglas Company B0697, Oct. 31, 1987, pp. 1-38.

*Primary Examiner*—Gary Chin
*Attorney, Agent, or Firm*—Ronald E. Champion

[57] ABSTRACT

A terrain referenced navigation system utilizing a woods database model including a method for increasing terrain referenced navigation accuracy by compensating for the existence of deciduous forests. Deciduous forests present increased terrain referenced navigation inaccuracies during months that trees lack leaves. The terrain referenced navigation database is modified to include a woods bit to indicate the existence of a deciduous forest. The terrain referenced navigation algorithm is modified to account for the existence of the deciduous forest.

5 Claims, 3 Drawing Sheets

TERRAIN REFERENCED NAVIGATION—WOODS DATA BASE MODEL

This invention relates to a terrain referenced navigation system and, more particularly, for a method of increasing the accuracy of a terrain referenced navigation system when used with a geophysical database representing a forest.

BACKGROUND OF TERRAIN REFERENCED NAVIGATION

One prior art terrain aided navigation system is available from Sandia Labs. Sandia has created the Sandia Inertial Terrain-Aided Navigation (SITAN) flight-computer algorithm that produces a very accurate trajectory for low-flying, high-performance aircraft by combining outputs from a radar or laser altimeter, an inertial navigation system (INS), and a digital terrain elevation map. SITAN is a recursive, real time, terrain-aided navigation algorithm for use on fighter aircraft. The algorithm has been implemented in a popular microprocessor. The aircraft's position can be estimated within a 926 meter circle error of probability. A good description of the SITAN terrain aided navigation system can be found in the proceedings of the IEEE National Aerospace and Electronics Conference—NAECON, May 20–24, 1985 entitled *The AFTI/F16 Terrain-Aided Navigation System*, by D. D. Boozer, M. K. Lau, J. R. Fellerhoff, Sandia National Laboratories, Albuquerque, N. Mex. 87185.

SITAN utilizes Kahan filter algorithms to process geophysical measurements. The algorithm estimates errors in a flight path produced by an inertial navigation system following the equations given in the above-mentioned article.

The Kahan filter can be formed with the following state model:

$$67\ \underline{X}_{k+1} = \phi \delta X_k + \underline{W}$$

and the measurement $$C_k = C(\underline{X}_k) + V_k$$
$$= Z_k - h(.,.) + V_k$$

where $\delta X_k$ = INS error states to be estimated
$\Phi$ = state-transition matrix for INS errors
$\underline{X}_k$ = states of INS and aircraft
$C_k$ = ground clearance measurement
$Z_k$ = altitude of aircraft
$h$ = height of terrain at position ( .,. )
$\underline{W}_k$ = driving noise with $E(\underline{W}_k) = \underline{0}$ for all k and $E(\underline{W}_k \underline{W}_j^T) = Q_k \delta_{kj}$
$V_k$ = measurement error with $E(V_k) = 0$ for all k and $E(\underline{V}_k \underline{V}_j) = R_k \delta_{kj}$
$k$ = subscript denoting time k.

Since the measurement function c(x) is a nonlinear function of the states, the standard extended Kahan filter approach is used to obtain the measurement matrix, $$H_k = \frac{\partial c(\underline{X})}{\partial \underline{X}} \bigg|_{\underline{X} = \underline{X}_k(-)} = [-h_x, -h_y, 1, 0, 0 \ldots]$$

where $h_x$ and $h_y$ are the terrain slopes in the x and y directions of the map evaluated at $\underline{X}_k(-)$, the predicted aircraft position just before a measurement is processed at time k. The first three states are taken to be the x position, y position, and altitude, respectively. At any time k, $$\underline{X} = \underline{X}_{INS} + \delta \underline{X}$$

The state vector often used in a single filter implementation is $$\delta \underline{X} = [\delta X\ \delta Y\ \delta Z\ \delta V_X\ \delta V_Y]^T$$

where $\delta X$, $\delta Y$, $\delta Z$, $\delta V_x$, and $\delta V_Y$ are errors in the X position, Y position, altitude, X velocity, and Y velocity, respectively. Other INS errors and states can also be included in $\delta \underline{X}$ by using the proper $\Phi$.

Parallel SITAN was developed because the distance needed by SITAN to reach steady state becomes excessive as initial position errors (IPEs) approach several hundred meters. Parallel SITAN is a bank of extended Kahan filters that process identical altimeter measurements. After some updates, the filter with the minimum average weighted residual squared (AWRS) value is identified as having the correct position estimate. The AWRS value is defined by $$AWRS_{jth\ filter} = \frac{1}{n} \left[ \sum_{i=1}^{n} \frac{\Delta_i^2}{H_i P_i H_i^T + R_i} \right]_{jth\ filter}$$

where $\Delta_i$ is the residual at the ith update, n is the number of updates, and $HPH^T + R$ is the residual variance. Once the IPEs are reduced by the parallel filters, a single filter performs well, starting off essentially in steady state.

To implement parallel SITAN, the number and geometrical layout of the parallel filters needed to cover an IPE must be specified. A square, constant-spaced grid can be used to center the filters about the horizontal position indicated by the INS. Filters at and near the corners are then eliminated to reduce the number of filters. To further lighten the computational burden, three-state, instead of five-state, filters are often used in parallel SITAN with $$\delta \underline{X} = [\delta X\ \delta Y\ \delta Z]^T$$

For both the single and parallel filter implementation, a least-squares plane fit to the map, known as stochastic linearization, is used to compute the slopes, $h_x$ and $H_Y$. Horizontal uncertainties $\sigma_X$ and $\sigma_Y$ from the error-covariance matrix, defined by $$P = E[(\delta \underline{X} - \hat{\delta \underline{X}})(\delta \underline{X} - \hat{\delta \underline{X}})^T]$$

and $$Diag\ P = [\sigma_X^2\ \sigma_Y^2\ \sigma_Z^2\ \sigma_{V_X}^2\ \sigma_{V_Y}^2]$$

are used to determine the size of the plane. Residuals from the plane fit, $RFIT_k$, are added to the measurement error variance, $R_k$, to ensure that the SITAN filter assigns less weight to the measurement when the plane fit is either very large or is over a rough area, thus adapting to local terrain.

SITAN has three basic modes: acquisition mode, lost mode and track mode.

Acquisition Mode

When one of the filters identifies a reliable estimate of true aircraft position, the track mode is entered. A single five state Kahan filter is initialized at the estimated acquired position. During track mode, the aircraft's position is estimated every 100 meters. SITAN employs a mode control logic concept to handle the transition from track to lost and from acquisition to track.

Acquisition mode is used to locate the aircraft's position within a circular region of uncertainty. The region of uncertainty is called the circular error of probability or CEP. In SITAN a 2100 meter initial position CEP is covered with 57 3-state Kalman filters centered on a grid whose initial positions are 525 meters apart.

The state acquisition filters include error states. They can estimate an aircraft's position under significant INS velocity errors. Each filter is initialized with position error estimates. To ensure that erroneous information is not employed to update the filters, none of the filters are updated if the pitch altitude is greater than 30 degrees or if the altimeter loses lock or the INS fails.

If the mode control logic of SITAN indicates that the aircraft has deviated from the 2363 meter search area, the lost mode is initiated. The lost mode ceases to provide position estimates for the aircraft, and the pilot has to update the inertial navigation before restarting SITAN.

Track Mode

Track mode estimates the position of the aircraft during flight. The five state tracking filter is used. The acquisition mode initializes the track filters. The track mode makes estimates of terrain slopes in rectangles surrounding the center of the aircraft position. The track filters are not updated during track mode unless the inertial navigation system, altimeter, and other flight data are valid.

Track mode is entered when the aircraft's actual position is close to the estimated one. In the event of a false fix, the track filter is set at the wrong position and the SITAN algorithm will proceed as if it was correct. This produces large errors in estimated positions. It is imperative that the probability of a false fix be kept low. The following is taken from the above-mentioned article in regard to the mode control logic of SITAN.

With the design for the acquisition, lost, and track modes as described above, the mode-control logic is needed to determine in which mode the algorithm should operate. When large aircraft position errors exist, it should choose the acquisition mode; with small errors, the track. The main parameter used in the mode-control logic for transition from acquisition to track is the AWRS. FIG. 7 shows a cross-section of a three-dimensional AWRS surface where AWRS is a function of the parallel filter positions ($X_j$, $Y_j$). In the acquisition mode the parallel filters will tend to migrate to the relative minima of this surface.

To keep the parallel filters from migrating too far from their initial positions, a maximum of 128 updates is allowed. Four tests are performed after every 32 updates to determine if transition to the track mode is possible by selecting the acquisition filter with the minimum AWRS. Test 1 requires the selected filter to have an AWRS lower than a threshold value to ensure that the parallel filters are indeed over the correct aircraft position. If the parallel filters are configured over an area which does not include the true aircraft position, the global minimum of the AWRS curve is expected to shift upward. Test 2 requires contrast in the terrain, a sufficient difference between $AWRS_{min}$ and $AWRS_{max}$ to prevent transition to the track mode over very smooth areas such as water. Test 3, the false-fix test, requires that the minimum AWRS outside of an exclusion region, $AWRS^*_{min}$ does not compete with $AWRS_{min}$, where the size of the exclusive region is computed using $\sigma_X$ and $\sigma_Y$ of the selected filter. Statistically, as more updates are made, the separation between the global minimum and relative minima can be realized and still retain the same confidence level. Therefore, the required separation between $AWRS^*_{min}$ and $AWRS_{min}$ should be a function of 1/n, where n is the number of updates. Test 4 requires the $\sigma_X$ and $\sigma_Y$ of the selected filter to be smaller than its initial value, 200 m, indicating that improvements have been made in estimating the aircraft's position during acquisition.

If track is not entered after 128 updates, a test for the lost mode is made. If $AWRS_{min}$ is greater than a threshold, the lost mode is entered and AFTI/SITAN will not produce any more estimates until the pilot updates the INS, which will automatically restart AFTI/SITAN in the track mode. If the lost condition is not met, the parallel filters are reset and acquisition starts over. This process continues until track or lost mode is entered.

Once in track, the track filter's $\sigma_X$ and $\sigma_Y$ are checked continuously while its AWRS is checked every 64 updates. If either the $\sigma$'s or the AWRS is too high, AFTI/SITAN switches back to the acquisition mode. The test on $\sigma$ prevents the track filter from using excessively large plane fits to maintain track after flying over smooth terrain for a long time. The AWRS test checks for unbelievable filter residuals.

BACKGROUND OF THE INVENTION

The Sandia Inertial-Terrain Aided Navigation SITAN algorithm treated the presence of trees as a "map error" and proceeded knowing that the results were not accurate in an optimal sense. Other workers in the field of terrain-aided navigation have attempted to compensate for distortions due to deciduous trees by introducing an additional filtering state. Eric Scarman of SAAB Scandia AB Aerospace Division in a paper entitled *Kalman Filter For Terrain-Aided Navigation*, describes an approach to model a deciduous forest in terms of a state s. Quoting from the article:

Another approach is to introduce a wood model in terms of a state s and an equation, say $$\dot{s} = -\frac{1}{T}(s - e_{ss})$$

the output relation is then $$\zeta = z - h(x,y) - s + e_m$$

$e_{ss}$ has an assumed variance $Q_s$. As $Q_s$ increases, the system will use $\zeta$ more and more suspiciously, which makes the system less and less sensitive to such disturbances as woods. Finally when $Q_s$ is very large the system will not dare to draw any conclusions at all from $\zeta$. The position will then diverge at a rate determined by the inertial navigation system.

The method of the invention avoids the need to create an additional state equation to handle wooded areas, which in turn avoids the need for increased processing power.

Radar altimeter elevation returns from deciduous forests induce significant error as a terrain referenced navigation algorithm tries to correlate the elevations with stored elevation data. This error is not systematic and is, therefore, difficult to correct. Therefore, it is the desire to correct for deciduous forests in winter and summer in a terrain referenced navigation that motivates the invention.

SUMMARY OF THE INVENTION

It is one object of the invention to compensate for the existence of deciduous forests in winter and summer.

It is yet another object of the invention to include a woods bit for every element in the database.

It is another object of the invention to increase the accuracy of a terrain referenced navigation system by systematically eliminating the errors due to overflown wooded areas in summer and winter.

It is another object of the invention to desensitize the terrain referenced navigation system to the existence of ground cover.

It is yet another object of the invention to increase the overall positional accuracy of the terrain referenced navigation algorithm.

The invention utilizes a "woods" bit packed into each point of the terrain referenced navigation database.

BRIEF DESCRIPTION OF THE DRAWINGS

To illustrate the invention, a preferred embodiment of this invention will be described hereinafter with reference to the accompanying drawings. The preferred embodiment concerns a "woods" database model embodied as a data structure in a TRN database.

Other objects, features and advantages of the present invention will become apparent to those skilled in the art through the Description of the Preferred Embodiment, Claims, and drawings herein wherein like numerals refer to like elements.

DESCRIPTION OF THE PREFERRED EMBODIMENT

Figure 1:
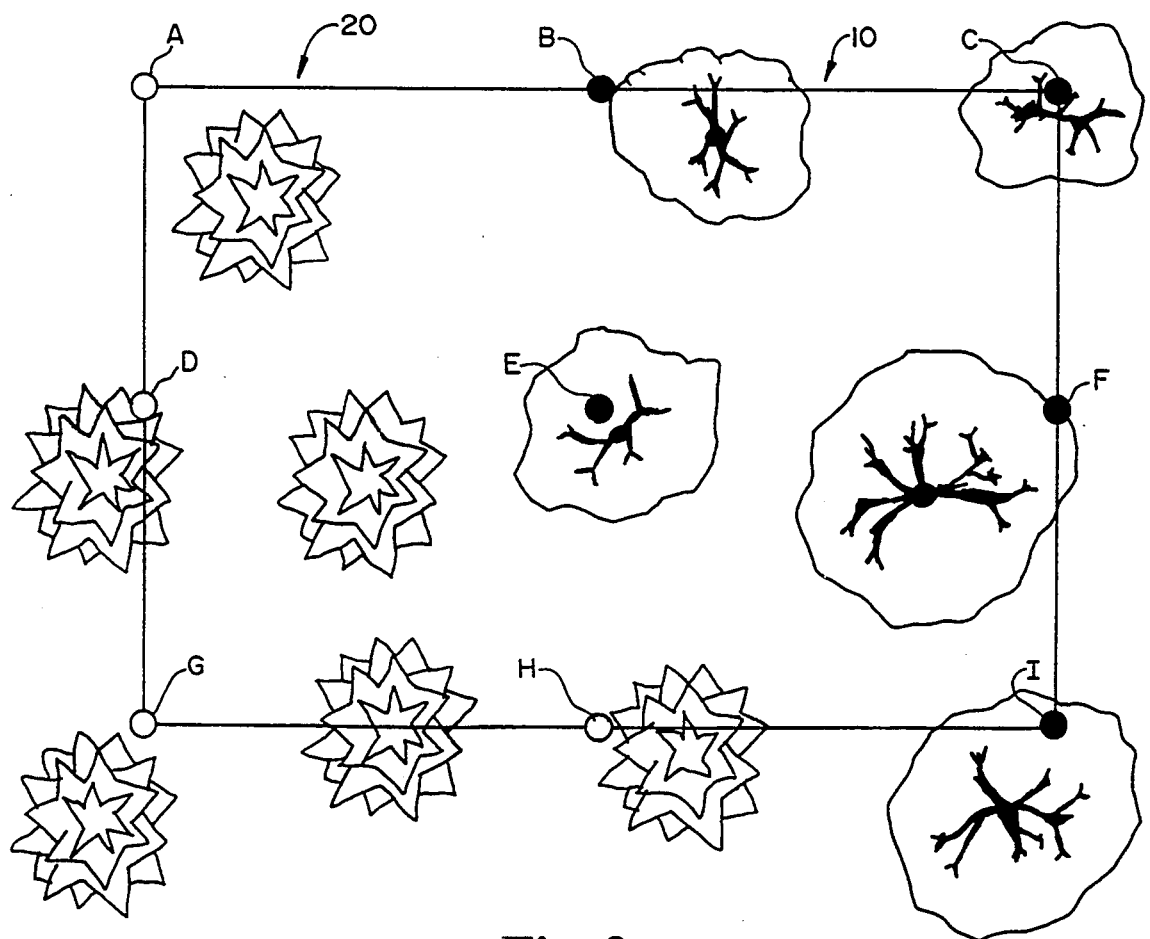
FIG. 1 shows a schematic diagram of 9 points in the TRN database showing the use of the woods bit.
Figure 2:
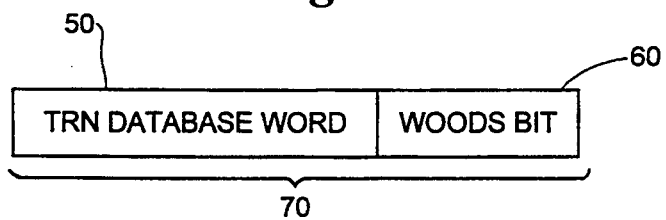
FIG. 2 shows the schematic diagram of one database element from the TRN database showing the inclusion of the woods bit.

FIG. 1 shows a schematic diagram of an overhead view of a boundary between a deciduous forest 10 and a conifer forest 20. The terrain is represented in the terrain referenced navigation database as elevation data for an array of latitudes and longitudes. The deciduous forest is indicated by region 10. The conifer forest is indicated by region 20. Sample data points are shown as small circles A-I, the point in the upper left hand corner is indicated by A. The method of the invention incorporates a woods bit 60 as shown in FIG. 2. Points A, D, G, and H are located in the conifer forest 20. Points B, C, E, F, and I are located in the deciduous forest 10.

FIG. 2 is a schematic representation of the terrain referenced navigation database value. The terrain referenced navigation database word is composed of a first part 50 consisting of elevation data and of the database vector and a second part 60 consisting of a woods bit. Those skilled in the art will understand that the woods bit 60 could be incorporated in the database using an encoding scheme. The woods bit may also occur anywhere within the database field 70.

Figure 3:
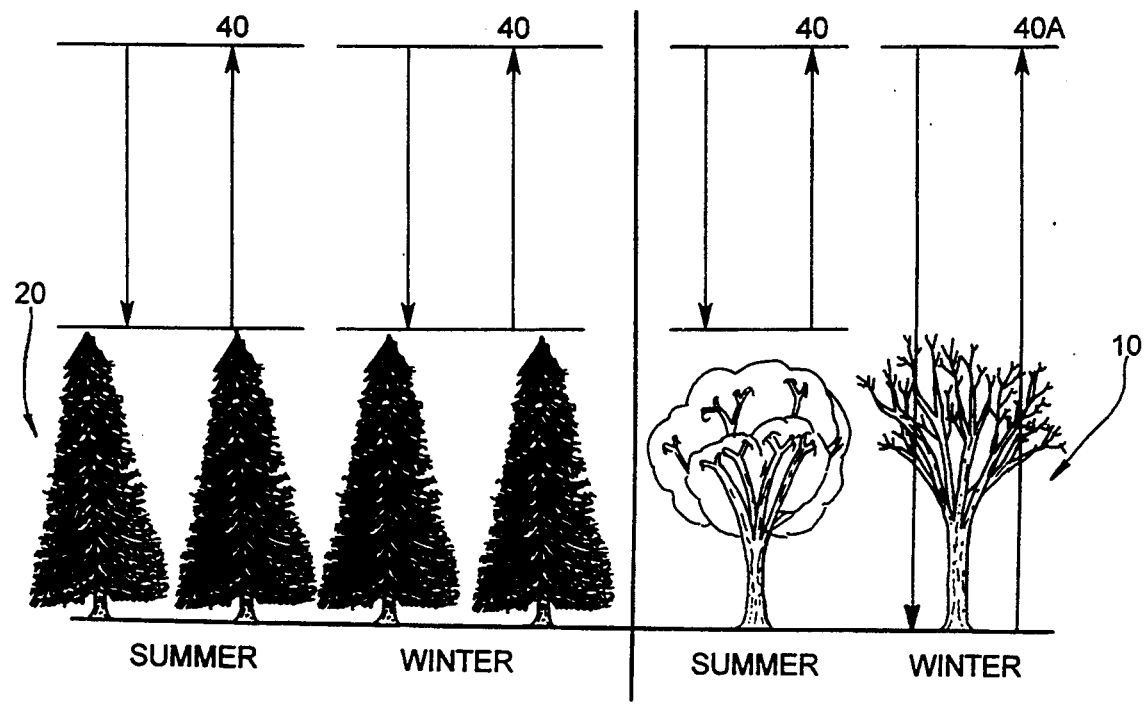
FIG. 3 shows a schematic representation of the effect on altimeter data of changes in season.

FIG. 3 shows a schematic diagram of the effect of a deciduous forest on the altimeter reading. It can be seen that conifer forest 20 reflects the same ground elevation 40 in winter as in summer but the deciduous forest 10 shows a different radar profile 40A in summer versus winter. In winter, without the leaves to reflect the radar signal, the altitudes given by the radar altimeter are increased. This results in a error to the terrain referenced navigation algorithm making it difficult to correlate ground positions. The method of the invention, therefore, incorporates in the terrain referenced navigation database, a state exclusively dedicated for the indication of a deciduous forest—the woods bit 60. If the woods bit is not activated this condition indicates either a conifer forest, treeless expanse or a body of water.

The terrain referenced navigation system will then employ knowledge of the hemisphere in which the plane is flying and the season or time of the year in which the readings are being taken. Thus, in summer, for a database that has been characterized during the summer, elevation data is considered to be accurate. In a winter flight where elevation data has been taken during the summer, terrain navigation elevations will be adjusted for the average height of the conifer forest.

The terrain referenced navigation algorithm of the invention correlates radar altimeter return profiles with digital terrain elevation data DTED to choose position information. When the aircraft is flying at a low level the radar altimeter can see the tops of trees instead of the ground when woods and forest are overflown. The method of the invention recognizes that the overflown areas of forests compensate for error in real time.

Figure 4:
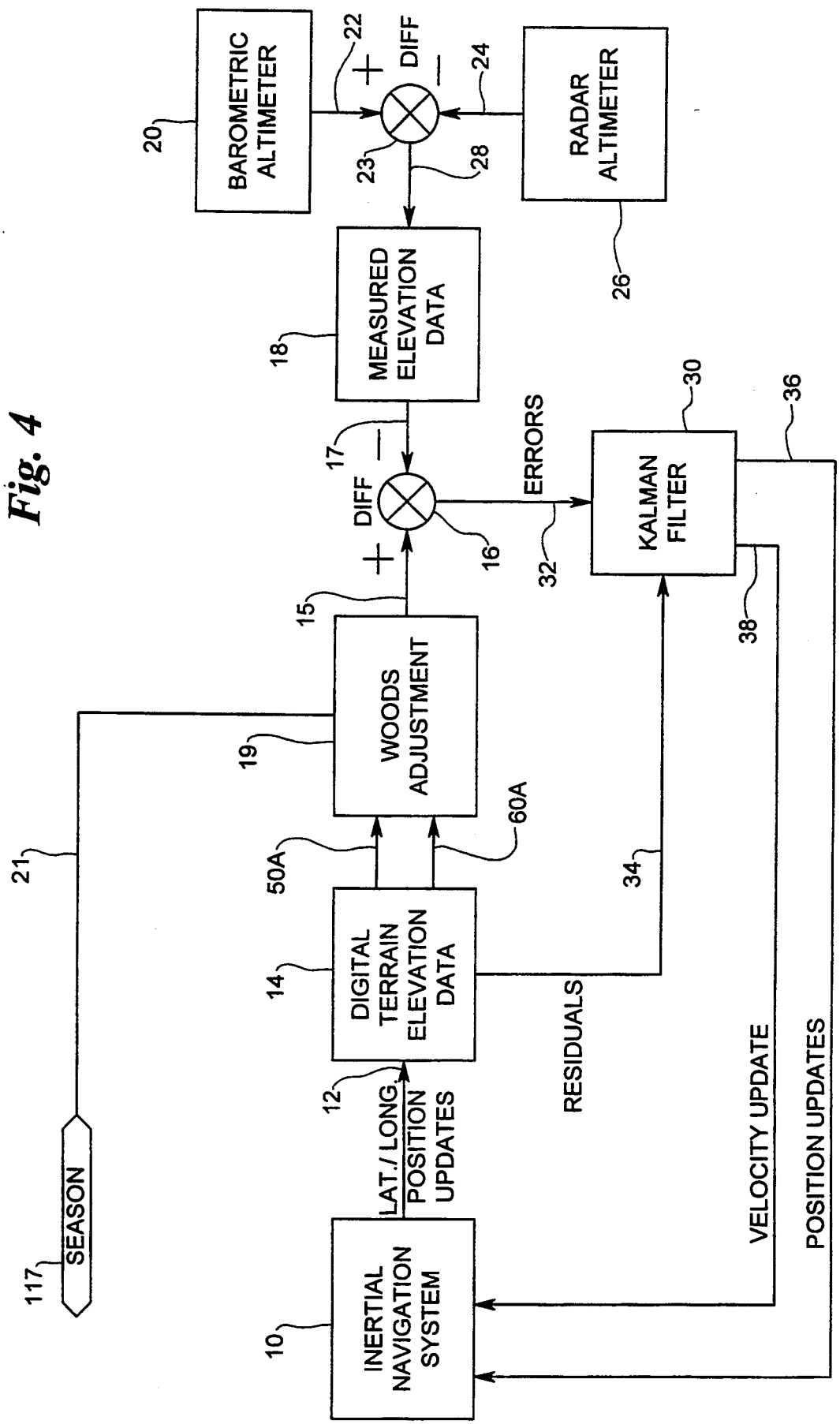
FIG. 4 shows a generalized terrain aided navigation system.

Now referring to FIG. 4 which shows a generalized terrain aided navigation system. In general, terrain aided navigation systems utilize a barometric altimeter 20 to obtain aircraft elevation data 22 and a down-looking radar or laser altimeter 26 to obtain aircraft ground clearance information 24. The ground clearance data 24 is then subtracted using a subtractor 23 from the aircraft elevation data 22 to obtain an estimate of the elevation of the terrain 28 which is below the aircraft. Digital terrain elevation (DTED) database 14 includes DTED data and residuals. Residuals 34 from the plane fit of the Kalman filter are added to the measurement error 32 to ensure that the filter assigns less weight to the measurement when the plane fit is either very large or is over a rough area, thus adapting to local terrain. The elevation data 17 is then subtracted, using a subtractor 16, from the associated map terrain elevation data 15 for that latitude/longitude 12 adjusted for the season of the year and the existence of a deciduous forest.

In one preferred embodiment of the invention a woods state adjustment 19 is made to the elevation information 50A and woods bit 60A from the digital terrain elevation database 14. The woods adjustment 19 is made based on a season input 21 to the woods state adjustment 19. In one preferred embodiment the season input could come from a clock 117.

For example if the elevation data was measured during the summer a deciduous state indication from the digital terrain elevation data woods bit 60A would indicate that no adjustment would need to be made if the current season 21 was summer. Likewise if the season 21 were winter, an adjustment for the absence of tree leaves would create a more accurate elevation output 15. In the case of winter, elevation data would be reduced by the height of the average deciduous forest.

The resulting error 32 is used with INS position 12 and velocity data in a Kalman Filter 30 to produce estimated aircraft position updates 36 and velocity updates 38 to the inertial navigation system 10.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A terrain referenced navigation system for use in an aircraft comprising:
   (a) a means for determining a current terrain elevation from the aircraft having a current terrain elevation output;
   (b) a means for inertial navigation having a latitude/longitude positional output, a selected position update input and a selected velocity update input;
   (c) a means for storing a digital terrain elevation map having a terrain latitude/longitude input connected to the latitude/longitude positional output and having a digital terrain elevation residual output and a woods indicator output and a digital terrain elevation output wherein the means for storing a digital terrain elevation map provides the digital terrain elevation residual output, woods indicator output, and digital terrain elevation output in response to the terrain latitude/longitude input, and wherein the woods indicator output indicates the existence or absence of a deciduous forest in the terrain;
   (d) a means for generating a woods state adjustment to the digital terrain elevation output so as to provide a woods adjusted digital terrain elevation output in accordance with the present season when said deciduous forest is indicated, the woods state adjustment means being coupled to the woods indicator output and the digital terrain elevation output;
   (e) a means for computing the difference between elevations connected to the current terrain elevation output and the woods adjusted digital terrain elevation output, wherein the means for computing the difference between elevations also includes a terrain error output; and
   (f) a means for terrain correlation connected to the digital terrain elevation residual output and the terrain error output and wherein the means for terrain correlation provides a terrain velocity update and a terrain position update.

2. The terrain referenced navigation system of claim 1 wherein the means for terrain correlation is a kalman filter.

3. The terrain referenced navigation system of claim 1 wherein the means for determining a current terrain elevation from the aircraft further comprises a barometric altimeter and a radar altimeter wherein the current terrain elevation is calculated from the difference between the barometric altimeter and the radar altimeter.

4. The terrain referenced navigation system of claim 1 wherein the means for inertial navigation further comprises a laser gyro inertial navigation system.

5. The terrain referenced navigation system of claim 1 wherein the means for storing a digital terrain elevation map further comprises an optical disk.

* * * * *